United States Patent
Feng et al.

(10) Patent No.: US 12,359,568 B2
(45) Date of Patent: Jul. 15, 2025

(54) METHOD FOR BACKFILLING AND RECONSTRUCTING CARBON STORAGE SPACE IN ABANDONED MAIN ROADWAY AND STORING $CO_2$

(71) Applicant: Taiyuan University of Technology, Taiyuan (CN)

(72) Inventors: Guorui Feng, Taiyuan (CN); Junbiao Ma, Taiyuan (CN); Jinwen Bai, Taiyuan (CN); Ruikai Pan, Taiyuan (CN); Yanna Han, Taiyuan (TW); Xudong Shi, Taiyuan (CN); Jiachen Mi, Taiyuan (CN); Guowei Wu, Taiyuan (CN); Jun Guo, Taiyuan (CN); Fei Chang, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 168 days.

(21) Appl. No.: 18/364,733

(22) Filed: Aug. 3, 2023

(65) Prior Publication Data
US 2024/0360762 A1    Oct. 31, 2024

(30) Foreign Application Priority Data
Apr. 28, 2023  (CN) .......................... 202310479127.5

(51) Int. Cl.
*E21F 17/16*    (2006.01)
*C04B 14/06*    (2006.01)
(Continued)

(52) U.S. Cl.
CPC .............. *E21F 17/16* (2013.01); *C04B 14/06* (2013.01); *C04B 18/0418* (2013.01);
(Continued)

(58) Field of Classification Search
CPC ........ E21F 17/16; E21D 11/10; E21D 11/107; C04B 14/06; C04B 18/0418;
(Continued)

(56) References Cited

U.S. PATENT DOCUMENTS 3,690,167 A * 9/1972 Chase, Jr. ............... E21B 47/11
436/27
4,093,310 A * 6/1978 Terry ..................... E21B 43/305
166/292

(Continued)

FOREIGN PATENT DOCUMENTS

CN           113217100 A * 8/2021 .............. E21F 15/00

*Primary Examiner* — Benjamin F Fiorello
(74) *Attorney, Agent, or Firm* — Volpe Koenig

(57) ABSTRACT

Disclosed is a method for backfilling and reconstructing a carbon storage space in an abandoned main roadway and storing $CO_2$. A surrounding rock of the main roadway is surveyed through geophysical exploration technology, and an anchor bolts (anchor cables) are used to reinforce and support an area which has unstable confining pressure bearing. According to a width and a height of the roadway section of the main roadway, a support formwork is forged in advance, and after the support formwork is placed in the main roadway, backfilling slurry is injected to the periphery of the support formwork. Meanwhile, supercritical carbon dioxide is injected into the backfilling slurry and the roadway, respectively.

6 Claims, 3 Drawing Sheets

(51) Int. Cl.
*C04B 18/04* (2006.01)
*C04B 22/06* (2006.01)
*C04B 22/14* (2006.01)
*C04B 40/02* (2006.01)
*E21D 11/10* (2006.01)
*C04B 111/00* (2006.01)

(52) U.S. Cl.
CPC .......... *C04B 22/064* (2013.01); *C04B 22/143* (2013.01); *C04B 40/0231* (2013.01); *E21D 11/10* (2013.01); *C04B 2111/00017* (2013.01)

(58) Field of Classification Search
CPC . C04B 22/064; C04B 22/143; C04B 40/0231; C04B 2111/00017
See application file for complete search history.

(56) References Cited

U.S. PATENT DOCUMENTS

| | | | |
|---|---|---|---|
| 4,537,062 A * | 8/1985 | Ernst | E21B 47/11 |
| | | | 436/28 |
| 11,408,283 B2 * | 8/2022 | Mancini | E21D 11/105 |
| 2001/0002969 A1 * | 6/2001 | Johansson | B65G 5/00 |
| | | | 405/150.1 |
| 2017/0254202 A1 * | 9/2017 | Kern | E21D 11/10 |
| 2020/0263542 A1 * | 8/2020 | Mulvoy | E21D 5/12 |

* cited by examiner

METHOD FOR BACKFILLING AND RECONSTRUCTING CARBON STORAGE SPACE IN ABANDONED MAIN ROADWAY AND STORING CO$_2$

CROSS-REFERENCE TO RELATED APPLICATION

This patent application claims the benefit and priority of Chinese Patent Application No. 2023104791275 filed with the China National Intellectual Property Administration on Apr. 28, 2023, the disclosure of which is incorporated by reference herein in its entirety as part of the present application.

TECHNICAL FIELD

The present disclosure relates to the technical fields of emission reduction, carbon reduction, and abandoned space reutilization, in particular to a method for synchronously storing carbon dioxide and backfilling and reusing a space of an abandoned main roadway.

BACKGROUND

As an important strategic goal in Chinese energy field, "carbon peak and carbon neutrality" will accelerate the formation and sustainable growth of green economy with new driving force, and significantly improve the quality and effectiveness of economic and social development. At present, with energy consumption under control and green development, carbon capture, utilization and storage technology has developed rapidly as a technology of reducing large-scale greenhouse gas emission. Based on basic national conditions of more coal and less oil in China, huge mined-out space formed after the mining of a large number of coal resources has become a natural space for carbon emission and storage. Main roadway spaces with small surrounding rock damage and high support strength have more prominent advantages. Therefore, it is urgent to find a technology to reuse the space of the abandoned main roadway and achieve carbon dioxide storage.

At present, there are many existing technologies related to the utilization of main roadways of the abandoned mine shafts. A novel method for waste concrete deposit and carbon dioxide storage in an abandoned mine shaft is disclosed in Chinese Patent Publication No. CN107780965A, through the method, waste concrete is backfilled into a goaf, and then carbon dioxide is stored, which effectively realizes carbon storage. However, the goaf is not fully utilized. An inspection, detection and reinforcement method for reutilization of a main roadway of an abandoned mine shaft is disclosed in Chinese Patent Publication No. CN112879036A, which is provides an evaluation method for the utilization of the main roadway of an abandoned mine shaft, but the cost for the backfilling and utilization of the main roadway is high, and the carbon dioxide storage is not realized to the greatest extent.

To sum up, it is urgent to find a method for synchronously storing carbon dioxide by backfilling and reconstructing a space of an abandoned main roadway. The synchronization of chemical storage and physical storage of carbon dioxide in the space of the abandoned roadway is achieved, the engineering efficiency is improved greatly, and broad market prospects and practical value are achieved.

SUMMARY

For the defects in the prior art, an objective of some embodiments is to provide a method for backfilling and reconstructing a carbon storage space in an abandoned main roadway and storing CO$_2$. In accordance with the method, redevelopment and utilization of the space of the abandoned main roadway are achieved, and supercritical carbon dioxide is injected when fractures on the roadway section of the abandoned main roadway are plugged by grouting, and the supercritical carbon dioxide is also injected into an internal space of the roadway. The method achieves the synchronization of reinforcement and utilization of the roadway, the chemical storage and physical storage of the carbon dioxide, which provides a new storage solution for the carbon dioxide storage, and greatly improves the engineering efficiency.

A method for backfilling and reconstructing a carbon storage space in an abandoned main roadway and storing CO$_2$, comprising following steps of:

step 1, surveying a surrounding rock of the main roadway, analyzing a lithology of the surrounding rock, a density of the surrounding rock and fractures and cavities inside the main roadway;

step 2, reinforcing and supporting a damaged portion, which has unstable confining pressure bearing characteristics, of the surrounding rock by anchor bolts or anchor cables, so as to ensure a stable operation of the main roadway;

step 3, customizing a support formwork according to a width and a height of a roadway section of the main roadway, wherein the support formwork is spaced apart a distance of 50 cm to 80 cm from a top, two sides and a floor of the main roadway;

step 4, constructing a first backfilling wall at a first end of the main roadway, wherein a thickness of the first backfilling wall is of 50 cm to 60 cm to ensure that the first end of the roadway is completely sealed without air leakage;

step 5, placing the support formwork made in step 3 inside the main roadway, splicing the support formwork according to a shape of the main roadway, attaching the support formwork closely to the first backfilling wall, and temporarily fixing the spliced support formwork by the anchor bolts and the anchor cables;

step 6, injecting backfilling slurry into a gap between the support formwork and the main roadway through a backfilling pipeline to form a backfilling thickness of 50-80 cm around the main roadway; injecting supercritical carbon dioxide into the backfilling slurry between the support formwork and the main roadway, and enabling the supercritical carbon dioxide to fully react with the backfilling slurry for 3 h to 5 h to solidify the backfilling slurry to reach a support strength of 1 MPa to 2 MPa, and then stopping injecting the supercritical carbon dioxide;

step 7, dismantling the support formwork and constructing a second backfilling wall at an interval of 30 m to 40 m from the first backfilling wall, after the backfilling slurry fully reacts with the supercritical carbon dioxide and solidifies;

step 8, injecting the supercritical carbon dioxide into an enclosed space between the first backfilling wall and the second backfilling wall through a gas injection hole reserved on the second backfilling wall, and stopping injecting the supercritical carbon dioxide when an injection pressure of the supercritical carbon dioxide is from 1 MPa to 1.5 MPa and a CO$_2$ concentration in the enclosed space between the first backfilling wall and second backfilling wall reaches 5,000 ppm and more, and then sealing the reserved gas injection hole reserved on the second backfilling wall;

step 9, constructing the support formwork on a side which is opposite to the first backfilling wall, of the second backfilling wall, continuing to form an other enclosed space by constructing the support formwork, repeating step 5 to step 8, injecting the backfilling slurry and the supercritical carbon dioxide to the other enclosed space outside of the support formwork, and injecting the supercritical carbon dioxide into an enclosed space between the second backfilling wall and a third backfilling wall; and step 10, when the carbon storage space of the main roadway is backfilled and sealed to the second end of the main roadway, constructing a final backfilling wall at the second end of the roadway to enclose the roadway space, injecting the supercritical oxide dioxide into the carbon storage space, and sealing the carbon storage space.

Preferably, surveying the surrounding rock of the main roadway in step 1 comprises: in response to determining a position of the abandoned main roadway, surveying bearing characteristics, damage depth and crack characteristics of the surrounding rock of the main roadway by utilizing a propagation law of artificially excited seismic waves in different elastic strata.

Preferably, step 2 further comprises: identifying the damaged portion, which has unstable confining pressure bearing characteristics, of the surrounding rock, by comprehensively evaluation after the surrounding rock of the main roadway is surveyed in step 1 by using geophysical exploration technology.

Preferably, the anchor bolts that reinforce and support the damaged portion of the surrounding rock in step 2 are resin rock bolts with Model MSGLW-500/22, and the resin rock bolts each have a specification of $\varphi 22$ mm×2,400 mm, a designed anchoring force of greater than or equal to 190 kN/bolt and a row spacing of 600 mm×600 mm, and the anchor cables that reinforce and support the damaged portion of the surrounding rock in step 2 are anchor cables each having a specification of $\varphi 22$ mm×8,000 mm, a designed anchoring force of greater than or equal to 240 kN/bolt, and a row spacing of 1,500 mm×1,800 mm are respectively used.

Preferably, step 3 further comprises: forging the support formwork in advance according to the width and the height of the roadway section of the main roadway, and forming the support formwork by splicing steel plates and connecting buckles; wherein the support formwork comprises an arched upper part and a square lower part, that is, the formwork comprises two vertical plates, an arched plate and a bottom transverse plate; and a length of the support formwork in the main roadway is from 30 m to 40 m.

Preferably, in step 6, the backfilling slurry is prepared from water, cement, caustic sludge, sand and admixture in proportion; a ratio of the caustic sludge to the sand is 5:2 to 5:4, the cement is added with a mass of 10%-20% of the mass of three solid raw materials which include the caustic sludge, the sand and the cement, and the admixture is a compound activator prepared from CaO and $CaSO_4$ in a ratio of 1:1 and has a mass of 1%-1.5% of a total mass of solid raw materials, and the backfilling slurry with a mass concentration of 74%-80% is prepared by adding water into the admixture, the caustic sludge, the sand and the cement.

Preferably, the caustic sludge is waste residue with calcium salts of $CaCO_3$, $CaSO_4$ and $CaCl_2$), wherein $CaCO_3$ accounts for 40%-70% of a total mass of the caustic sludge, and the prepared backfilling slurry is alkaline, with a pH value of 9-11; the supercritical carbon dioxide fully reacts with $CaCO_3$ after injection to absorb a large amount of carbon dioxide, so as to achieve the purpose of chemical storage for the carbon dioxide.

Preferably, the supercritical carbon dioxide is converted by a carbon dioxide collector and a carbon dioxide converter on the earth surface, and is pumped to the main roadway through a connecting pipeline.

Some embodiments have the beneficial effects as follows.

In accordance with some embodiments, a surrounding rock of a roadway is surveyed through a geophysical exploration technology, and an anchor bolt (anchor cable) is used to reinforce and support an area has unstable confining pressure bearing. According to a width and a height of a roadway section of the main roadway, a support formwork is forged in advance, and after the support formwork is placed in the main roadway, backfilling slurry is injected to a gap between the support formwork and the main roadway through a backfilling pipeline, and then supercritical carbon dioxide is injected into the backfilling slurry to fully react with the backfilling slurry. Afterwards, the supercritical carbon dioxide is injected into an enclosed space which is enclosed by two adjacent backfilling walls and the solidified slurry, so as to achieve the synchronous storage of the carbon dioxide. The method can achieve the synchronization of all of reinforcement and utilization of the roadway, as well as the chemical storage and physical storage of the carbon dioxide, which provides a new solution for carbon dioxide storage and has extremely high market prospects and practical value.

Figure 1:
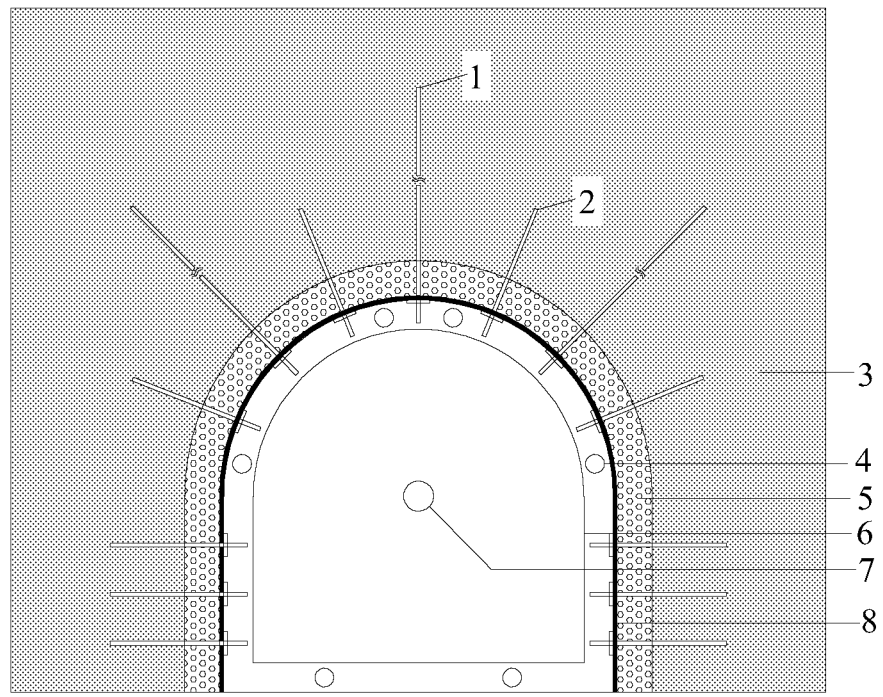
FIG. 1 is a schematic diagram of a device for backfilling and reconstructing a carbon storage space in an abandon main roadway and storing $CO_2$ according to an embodiment of the present disclosure.
Figure 2:
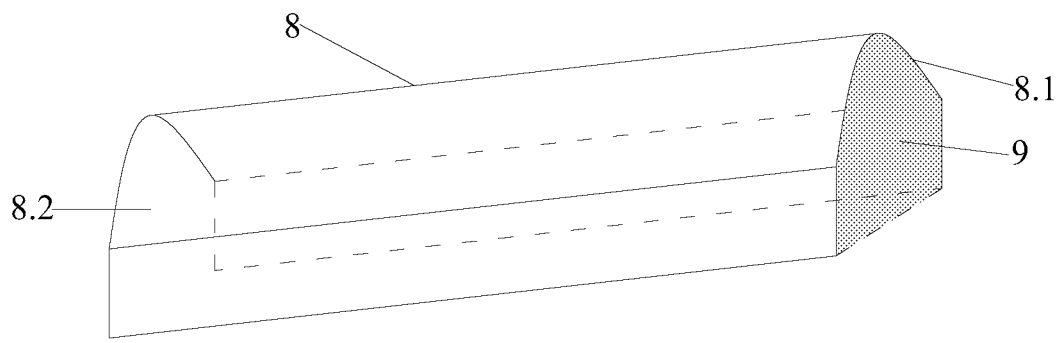
FIG. 2 is a perspective view of an abandoned main roadway with a backfilling wall constructed at one end thereof according to an embodiment of the present disclosure.

In the drawings: 1 anchor cable, 2 anchor bolt, 3 surrounding rock of roadway, 4 gas injection pipe around supporting formwork, 5 fracture zone of surrounding rock, 6 support formwork, 7 gas injection pipe inside main roadway, 8 main roadway, 8.1 first end of roadway, 8.2 second end of roadway, 9 backfilling wall, 10 supercritical carbon dioxide.

DETAILED DESCRIPTION OF THE EMBODIMENTS

To make the advantages and technical solutions of the present disclosure more clearly, the present disclosure is further described clearly and completely below with reference to the accompanying drawings. The following embodiments are intended to be a schematic illustration and explanation of the present disclosure and are not intended to limit the scope of the present disclosure.

As shown in FIG. 1 through FIG. 6, a device for backfilling and reconstructing a carbon storage space in an abandon main roadway and storing $CO_2$ includes anchor cables 1, anchor bolts 2, a surrounding rock 3, gas injection pipes 4 around a support formwork, a fracture zone 5 of the surrounding rock, the support formwork 6, a gas injection pipe 7 inside a main roadway, the main roadway 8, and a backfilling wall 9.

The anchor cables 1 and the anchor bolts 2 are fixed to the surrounding rock 3 of the roadway and the fracture zone 5 of the surrounding rock, and the support formwork 6 is temporarily fixed to the anchor cables 1 and the anchor bolts 2.

Figure 3:
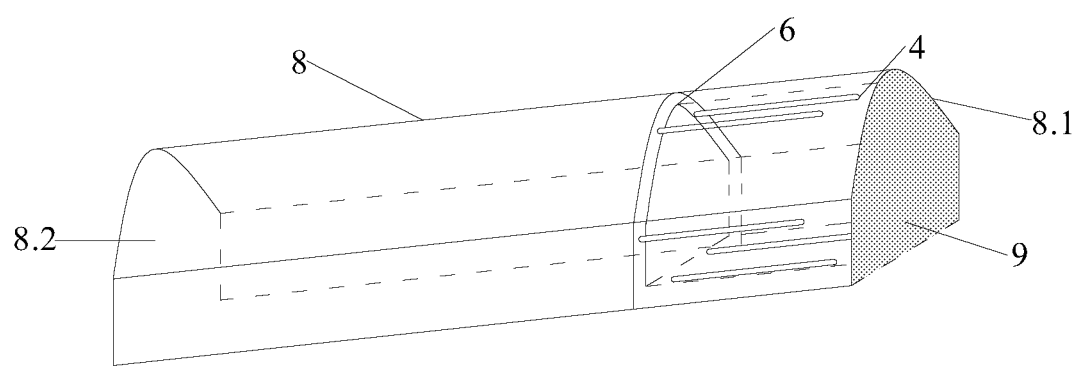
FIG. 3 is a perspective view of an abandoned main roadway in a first stage of the synchronous backfill and storage of carbon dioxide in a space therein according to an embodiment of the present disclosure.

As shown in FIG. 3, the support formwork is forged in advance according to the width and the height of the roadway section of the main roadway and is formed by splicing steel plates and connecting buckles, which is easy to dismantle and assemble. The support formwork includes an arched upper part and a cubic lower part, i.e., the formwork includes two vertical plates, an arched plate and a bottom transverse plate. The length of the support formwork in the roadway is from 30 m to 40 m. The support formwork 6 is formed by arched and overlapped steel plates, which is spaced apart a distance of 50 cm to 80 cm from a corresponding one side of the roadway section in any of directions in the upper, lower, left and right directions, and is fixed inside the roadway through the anchor bolts and the anchor cables.

Figure 4:
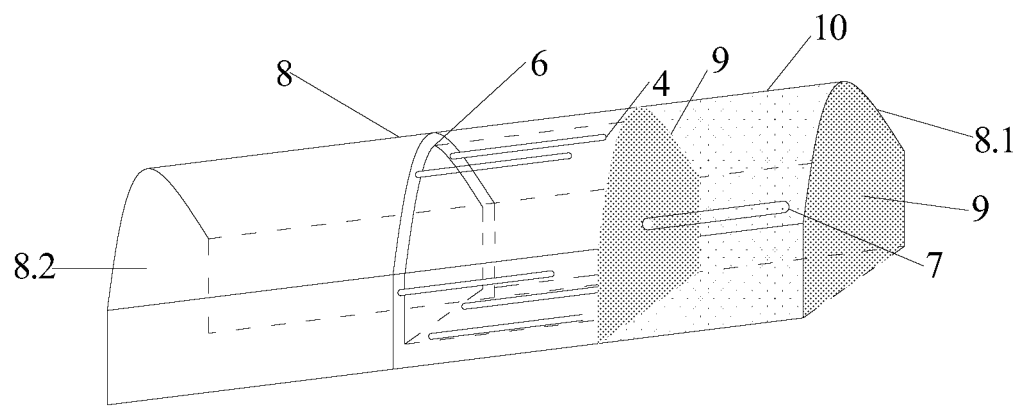
FIG. 4 is a perspective view of an abandoned main roadway in a N-th stage of the synchronous backfill and storage of carbon dioxide in a space therein according to an embodiment of the present disclosure.
Figure 5:
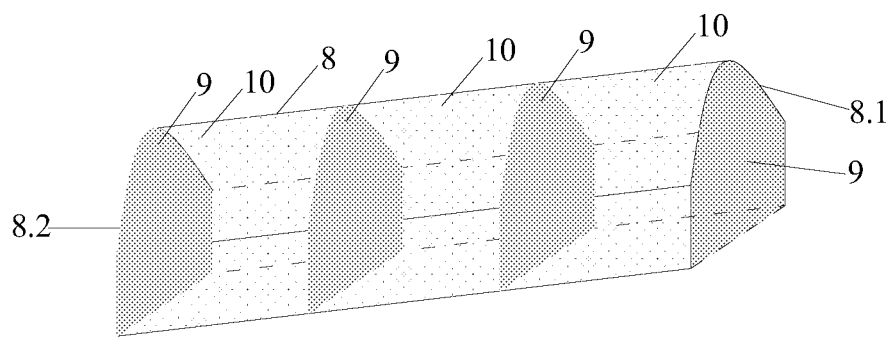
FIG. 5 is a perspective view of an abandoned main roadway in a N+1-th stage of sealing construction of backfilling according to an embodiment of the present disclosure.
Figure 6:
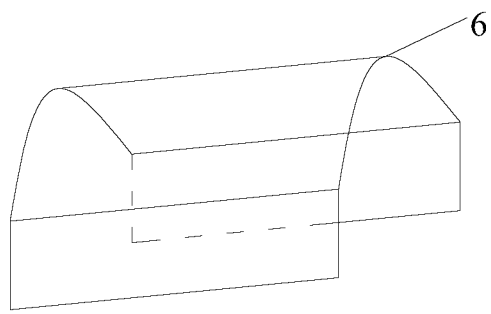
FIG. 6 is a perspective view of a support formwork for a main roadway according to an embodiment of the present disclosure.
Figure 7:
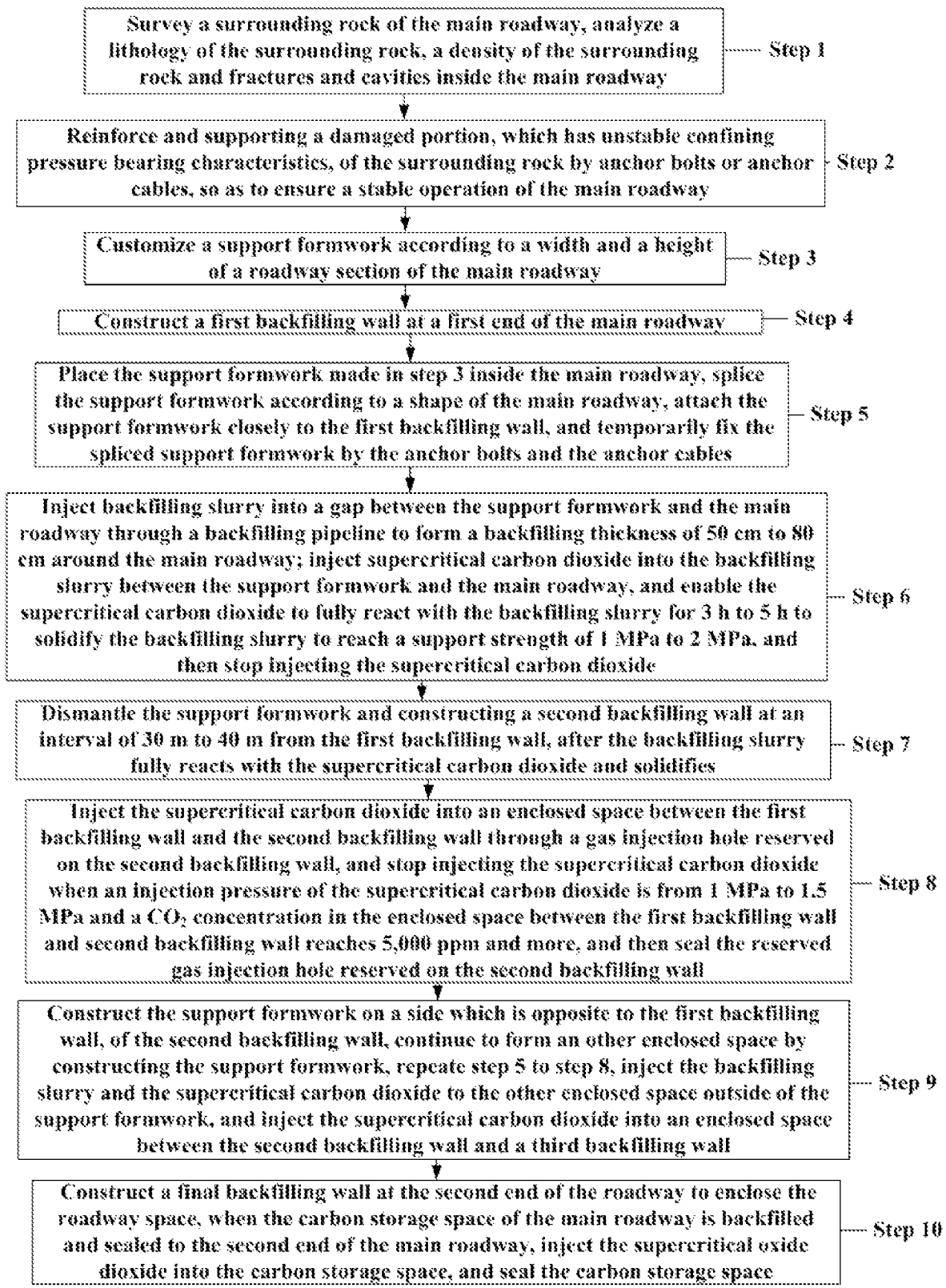
FIG. 7 is a schematic flowchart of a method for backfilling and reconstructing a carbon storage space in an abandon main roadway and storing $CO_2$ according to an embodiment of the present disclosure.

The gas injection pipes 4 around the support formwork are arranged around the support formwork 6, which is used for gas injection after backfilling slurry is injected (as shown in FIG. 3). After gas injection is completed, the support formwork 6 is dismantled, a backfilling wall is constructed, and a gas injection hole is reserved on the backfilling wall. A gas pipe 7 inside the main roadway passes through the gas injection hole to enter an enclosed space formed by two adjacent backfilling walls. The gas is injected into the constructed enclosed space through the gas injection pipe 7 inside the main roadway (as shown in FIG. 4).

Embodiment

A mine shaft is located in Taiyuan City, Shanxi Province, which was built in March 1991. After the mining license expired at the end of 2013, the mining license of the mine was not renewed, and the mine shaft has been closed and shut. The ground elevation of the mine shaft is −300 m. For each of three main roadways of a main transport roadway, a main track roadway and a main air-return roadway, the length is more than 5 km, the height and the width are both about 5 m. Solid rock strata is around the main roadway, which are not affected by mining disturbance. The main roadway is jointly supported by I-steel and concrete, and a roadway wall thereof is well preserved, with only a few areas seriously deformed. There are no large faults, folds and other large geological structures within 500 m around the main roadway, and the three main roadways have no use at present and are abandoned space. At a linear distance of 1 km away from the mine shaft, there is a thermal power plant in operation, the annual $CO_2$ emission of which reaches 2,888,000 tons and more, and the amount of carbon tax to be paid each year is nearly ten million. For above conditions, by adopting the method of the present disclosure, $CO_2$ from the nearby power plant can be stored into the abandoned main roadway of the shut mine shaft. The implementation method is further described below with reference to the accompanying drawings, with specific implementation steps as follows.

In step 1, an abandoned main track roadway 3 of the shut mine shaft and a fracture zone 5 of a surrounding rock are surveyed by a geophysical exploration technology, and the surrounding rock characteristics and fracture development degree of the abandoned main track roadway are analyzed.

In step 2, an area with poor bearing capacity and serious damage is determined in the surrounding rock 3 of the main roadway, and the main roadway is reinforced and supported by anchor cables 1 and anchor bolts 2, and crossheadings, chambers and other intersections of the main track roadway are sealed by concrete.

In step 3, a first backfilling wall 9 is constructed at the first end 8.1 of the main roadway 8, the thickness of the first backfilling wall 9 needs to reach about 50 cm to avoid air leakage.

In step 4, according to the section of the main roadway 8, a support formwork 6 is forged.

In step 5, the forged support formwork 6 is placed inside the main roadway 8, is spliced according to the shape of the main roadway, and is spaced apart a distance of 50 cm from a top, two sides and a floor of the main roadway (the space of 50 cm is reserved because the periphery of the roadway needs to be sealed by grouting, and fractures are not only formed in the roof and two sides of the roadway, but also the floor of the roadway). The spliced support formwork 6 is temporarily supported by the anchor cables 1 and anchor bolts 2.

In step 6, $CO_2$ exhausted from the power plant is converted into supercritical $CO_2$ through a carbon dioxide collector and a converter on the ground, and then is pumped to the underground main roadway through a connecting pipeline.

In step 7, the backfilling slurry is injected into a gap between the support formwork 6 and the main roadway 8 to form a backfilling thickness of 50 cm at the periphery of the roadway.

In step 8, the gas injection pipes 4 around the support formwork are arranged between the support formwork 6 and the main roadway 8, and the supercritical carbon dioxide is injected into the backfilling slurry through the gas injection pipes 4 around the support formwork. The supercritical carbon dioxide fully reacts with the backfilling slurry for 3 h to 5 h to solidify the backfilling slurry to reach a support strength of 1 MPa to 2 MPa, and then the gas injection for the supercritical carbon dioxide is stopped.

In step 9, after the backfilling slurry around the support formwork 6 solidifies after fully reacting with the supercritical carbon dioxide, the support formwork 6 is dismantled, and a second backfilling wall 9 is constructed at an interval of 30 m to 40 m.

In step 10, the gas injection pipe 7 inside the main roadway is arranged through a gas injection hole reserved on the second backfilling wall, the supercritical carbon dioxide is injected into an enclosed space between the first and second backfilling walls through the gas injection pipe 7 inside the main roadway, and the gas injection for the supercritical carbon dioxide is stopped when an injection pressure of supercritical carbon dioxide is from 1 MPa to 1.5 MPa and a $CO_2$ concentration in the enclosed space reaches 5,000 ppm. The gas injection pipe 7 inside the main roadway is taken out, and then the second backfilling wall is sealed.

In step 11, the support formwork 6 is constructed on a side, which is opposite to the first backfilling wall, of the second backfilling wall 9, an enclosed space is continuously formed by constructing the support formwork, the step 4 to the step 10 are repeated, the backfilling slurry and supercritical carbon dioxide are injected to the outside of the support formwork 6, and the supercritical carbon dioxide is injected into the enclosed space between two adjacent backfilling walls 9.

In step 12, when the carbon storage space of the main roadway 8 is gradually backfilled and sealed to the second end 8.2 of the roadway, a final backfilling wall 9 is constructed at the second end 8.2 of the main roadway, the supercritical oxide dioxide is injected into the final backfilling wall 9 and seal the carbon storage space of the roadway.

The foregoing embodiment is a preferred embodiment of the present disclosure, it should be noted that any variations and modifications made to the method above without departing from the technical essence and principle of the present disclosure fall within the scope of protection of the present disclosure.

What is claimed is:

1. A method for backfilling and reconstructing a carbon storage space in an abandoned main roadway and storing $CO_2$, comprising following steps of:
   step 1, surveying a surrounding rock of the main roadway, and analyzing a density of the surrounding rock of fractures and cavities inside the main roadway;
   step 2, reinforcing and supporting the surrounding rock of the fractures and cavities by anchor bolts or anchor cables, so as to ensure a stable operation of the main roadway;
   step 3, customizing a support formwork according to a width and a height of a roadway section of the main roadway, wherein the support formwork is spaced apart a distance of 50 cm to 80 cm from a top, two sides and a floor of the main roadway;
   step 4, constructing a first backfilling wall at a first end of the main roadway, wherein a thickness of the first backfilling wall is of 50 cm to 60 cm to ensure that the first end of the roadway is completely sealed without air leakage;
   step 5, placing the support formwork made in step 3 inside the main roadway, splicing the support formwork according to a shape of the main roadway, attaching the support formwork closely to the first backfilling wall, and temporarily fixing the spliced support formwork by the anchor bolts and the anchor cables;
   step 6, injecting backfilling slurry into a gap between the support formwork and the main roadway through a backfilling pipeline to form a backfilling thickness of 50 cm to 80 cm around the main roadway; injecting supercritical carbon dioxide into the backfilling slurry between the support formwork and the main roadway, and enabling the supercritical carbon dioxide to fully react with the backfilling slurry for 3 h to 5 h to solidify the backfilling slurry to reach a support strength of 1 MPa to 2 MPa, and then stopping injecting the supercritical carbon dioxide;
   step 7, dismantling the support formwork and constructing a second backfilling wall at an interval of 30 m to 40 m from the first backfilling wall, after the backfilling slurry fully reacts with the supercritical carbon dioxide and solidifies;
   step 8, injecting the supercritical carbon dioxide into an enclosed space between the first backfilling wall and the second backfilling wall through a gas injection hole reserved on the second backfilling wall, and stopping injecting the supercritical carbon dioxide when an injection pressure of the supercritical carbon dioxide is from 1 MPa to 1.5 MPa and a $CO_2$ concentration in the enclosed space between the first backfilling wall and second backfilling wall reaches 5,000 ppm and more, and then sealing the reserved gas injection hole reserved on the second backfilling wall;
   step 9, constructing the support formwork on a side which is opposite to the first backfilling wall, of the second backfilling wall, continuing to form an other enclosed space by constructing the support formwork, repeating step 5 to step 8, injecting the backfilling slurry and the supercritical carbon dioxide to the other enclosed space outside of the support formwork, and injecting the supercritical carbon dioxide into an enclosed space between the second backfilling wall and a third backfilling wall; and
   step 10, when the carbon storage space of the main roadway is backfilled and sealed to the second end of the main roadway, constructing a final backfilling wall at the second end of the roadway to enclose the roadway space, injecting the supercritical oxide dioxide into the carbon storage space, and sealing the carbon storage space.

2. The method for backfilling and reconstructing a carbon storage space in an abandoned main roadway and storing $CO_2$ according to claim 1, wherein the anchor bolts that reinforce and support the damaged portion of the surrounding rock in step 2 are resin rock bolts, and the resin rock bolts each have a specification of φ22 mm×2,400 mm, a designed anchoring force of greater than or equal to 190 kN/bolt and a row spacing of 600 mm×600 mm, and the anchor cables that reinforce and support the damaged portion of the surrounding rock in step 2 are anchor cables each having a specification of φ 22 mm×8,000 mm, a designed anchoring force of greater than or equal to 240 kN/bolt, and a row spacing of 1,500 mm×1,800 mm are respectively used.

3. The method for backfilling and reconstructing a carbon storage space in an abandoned main roadway and storing $CO_2$ according to claim 1, wherein step 3 further comprises: forging the support formwork in advance according to the width and the height of the roadway section of the main roadway, and forming the support formwork by splicing steel plates and connecting buckles; wherein the support formwork comprises an arched upper part and a square lower part; and a length of the support formwork in the main roadway is from 30 m to 40 m.

4. The method for backfilling and reconstructing a carbon storage space in an abandoned main roadway and storing $CO_2$ according to claim 1, wherein in step 6, the backfilling slurry is prepared from water, cement, caustic sludge, sand and admixture in proportion; a ratio of the caustic sludge to the sand is 5:2 to 5:4, the cement is added with a mass of 10%-20% of the mass of three solid raw materials which comprise the caustic sludge, the sand and the cement, and the admixture is a compound activator prepared from CaO and $CaSO_4$ in a ratio of 1:1 and has a mass of 1%-1.5% of a total mass of the three solid raw materials, and the backfilling slurry with a mass concentration of 74%-80% is prepared by adding water into the admixture, the caustic sludge, the sand and the cement.

5. The method for backfilling and reconstructing a carbon storage space in an abandoned main roadway and storing $CO_2$ according to claim 4, wherein the caustic sludge is waste residue with calcium salts of $CaCO_3$, $CaSO_4$ and $CaCl_2$), wherein $CaCO_3$ accounts for 40%-70% of a total mass of the caustic sludge, and the prepared backfilling slurry is alkaline, with a pH value of 9-11; the supercritical carbon dioxide fully reacts with $CaCO_3$ after injection to absorb a large amount of carbon dioxide, so as to achieve the purpose of chemical storage for the carbon dioxide.

6. The method for backfilling and reconstructing a carbon storage space in an abandoned main roadway and storing $CO_2$ according to claim 1, further comprising: converting the supercritical carbon dioxide by a carbon dioxide collector and a carbon dioxide converter on an earth surface, and pumping to the main roadway through a connecting pipeline.

* * * * *